R. M. HOPKINS.
RECORDING SYSTEM AND APPARATUS.
APPLICATION FILED DEC. 28, 1917. RENEWED APR. 14, 1919.

1,309,287. Patented July 8, 1919.

R. M. HOPKINS.
RECORDING SYSTEM AND APPARATUS.
APPLICATION FILED DEC. 28, 1917. RENEWED APR. 14, 1919.

1,309,287.

Patented July 8, 1919.
5 SHEETS—SHEET 2.

R. M. HOPKINS.
RECORDING SYSTEM AND APPARATUS.
APPLICATION FILED DEC. 28, 1917. RENEWED APR. 14, 1919.

1,309,287.

Patented July 8, 1919.
5 SHEETS—SHEET 3.

INVENTOR.
Richard M. Hopkins
BY
ATTORNEY

WITNESSES:

UNITED STATES PATENT OFFICE.

RICHARD M. HOPKINS, OF RUTHERFORD, NEW JERSEY, ASSIGNOR TO AMERICAN DISTRICT TELEGRAPH COMPANY, OF JERSEY CITY, NEW JERSEY, A CORPORATION OF NEW JERSEY.

RECORDING SYSTEM AND APPARATUS.

1,309,287.              Specification of Letters Patent.        Patented July 8, 1919.

Application filed December 28, 1917, Serial No. 209,257. Renewed April 14, 1919. Serial No. 290,080.

*To all whom it may concern:*

Be it known that I, RICHARD M. HOPKINS, a citizen of the United States of America, and a resident of Rutherford, in the county of Bergen and State of New Jersey, have invented a certain new and useful Recording System and Apparatus, of which the following is a specification.

My invention relates to selective systems, particularly systems for recording the signals of watchmen's signal boxes and the like, and constitutes a modification of, and improvement on the system for the same purpose set forth in my applications for Letters Patent, Serial No. 144,952, filed January 27, 1917, and Serial No. 171,940, filed May 31, 1917; though the present invention is not restricted to watchmen's signal recording systems, but is applicable generally to systems employing a plurality of selectors controlled by a master selector. However, it is convenient to describe my invention as applied to the system of said prior application.

Heretofore it has been common to record the signals of a plurality of watchmen's signal boxes on a single circuit, without distinguishing, other than by the box number, between locations from which the signals come. In many cases it happens that the signal boxes of several subscribers or premises or buildings are located in the same circuit, and it is desirable to make the records for the different subscribers, or premises, or buildings, on different portions of a record sheet, or on different record sheets or dials. For example, it is desirable to be able to send, periodically, to each subscriber, the records of signals received from the boxes in his own premises, without, of course, sending to him the records from the boxes in the same circuit which are in the premises of other subscribers. In any case, it is obviously desirable to record the signals from the boxes of any one subscriber or premises, separately from the signals from the boxes of other subscribers or premises. The invention of my said prior application Serial No. 144,952 comprises means whereby this may be done; *i. e.*, a record of the signals from any one group of signal boxes of a circuit may be made which shall be entirely separate from the records of other groups of boxes of the same circuit.

The present invention comprises means whereby clashes or other imperfect signals will be recorded separately.

One object of my invention is to cause the separate recording of clashes or other imperfect signals, and to do this in a simple manner and by simple means. Other objects will appear hereafter.

Hereinafter, for convenience in description, it will be considered that each group of signal boxes pertains to a separate subscriber, and, correspondingly, that each signal-recording magnet and its corresponding punching or other marking mechanism, hereinafter referred to, pertain to a single subscriber. Obviously, in point of fact, one subscriber might have a plurality of groups of signal boxes; all of the signal boxes of all of the groups herein contemplated might be located on premises of the same subscriber; and the term "subscriber" is, in itself, a mere convenient reference term, without any necessary relation to the facts of any particular installation or installations. However, for convenient classification and recording of signals, it is desirable that the boxes of a circuit be divided into groups, and for the purpose of description it is convenient to consider that each group of boxes pertains to the premises of a single subscriber; and in actual practice this will usually be the case.

I will now proceed to describe my invention with reference to the accompanying drawings, showing apparatus and circuits, constituting one embodiment of my invention, and will then point out the novel features in claims. In said drawings:

Figure 1 is a diagram illustrating a signal box circuit with a plurality of groups of signal boxes therein, and also illustrating diagrammatically the several selectors, relays, and record-making devices of the system.

Fig. 1ª shows an elevation of a characteristic break-wheel and its co-acting brush or pen, such as may be used in signal boxes, such as are illustrated diagrammatically in Fig. 1.

Figs. 2–9 are drawings illustrating one type of recorder adapted to be used in connection with a system indicated diagrammatically in Fig. 1, and comprising selectors such as are indicated diagrammatically in Fig. 1.

Figures 1, 1A:
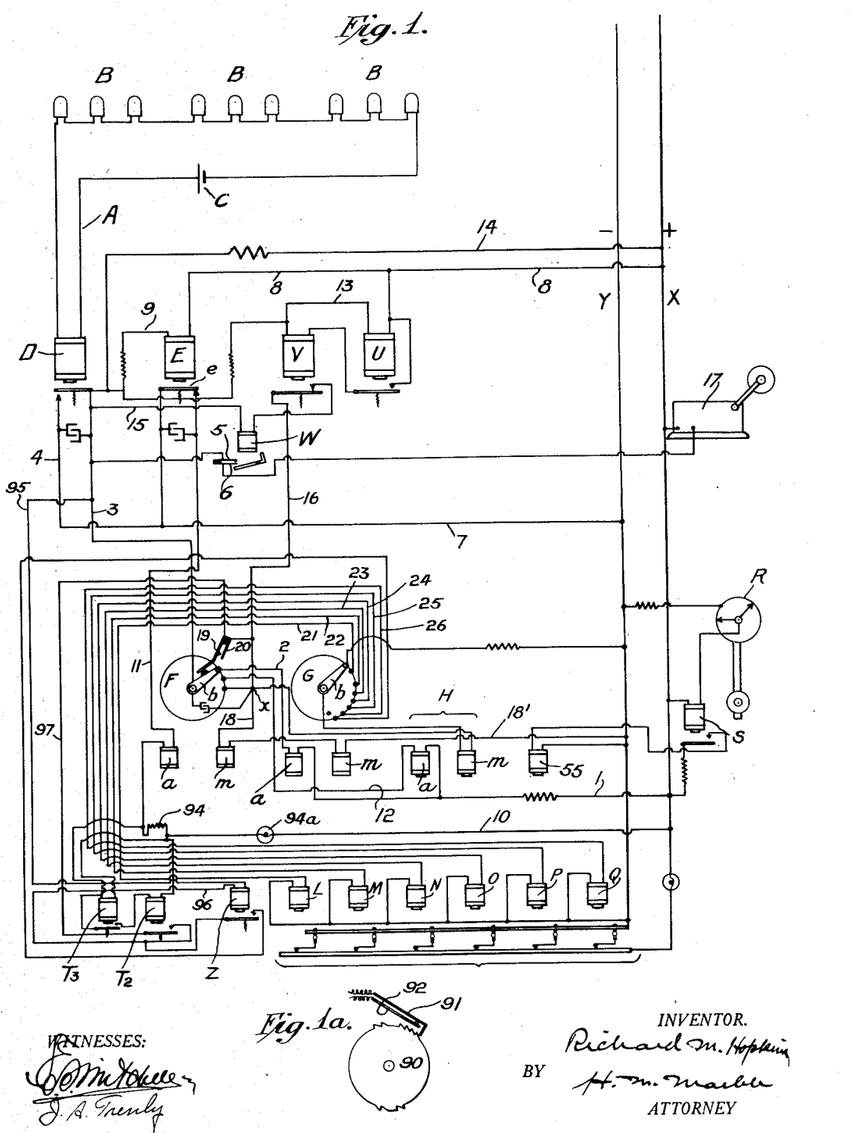
Figure 2:
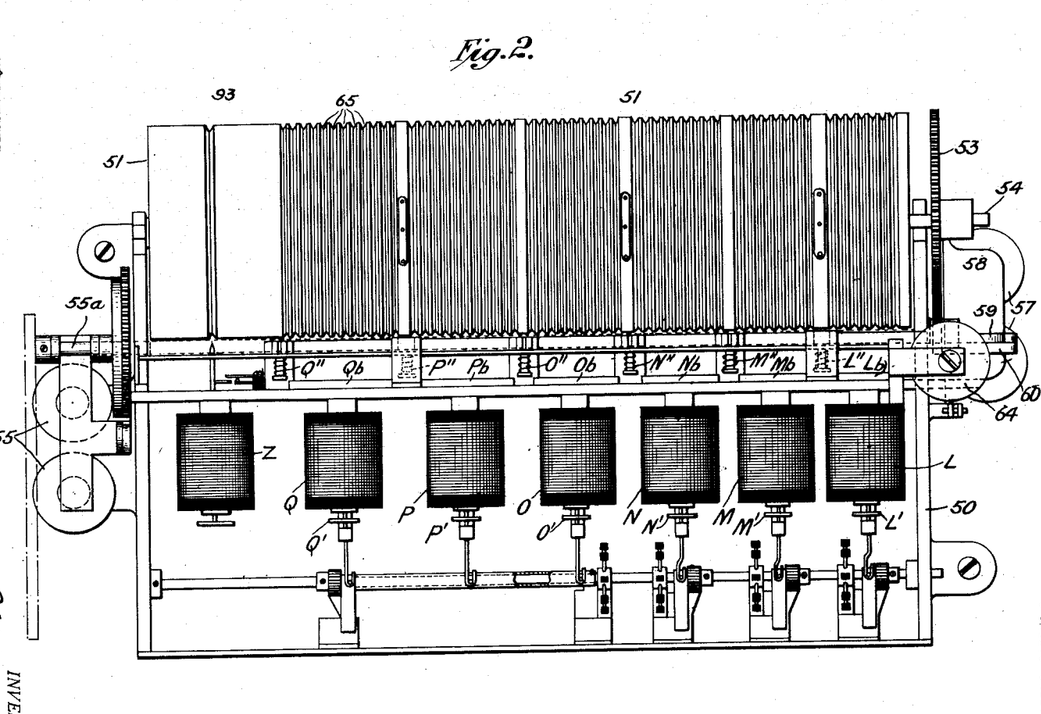
Fig. 2 shows a top view and partial section of said recorder.

Referring first to Fig. 1; A designates a signal box circuit comprising a plurality of groups of signal boxes B, the number of boxes in each group being variable. Each such box may be understood to comprise a signal-transmitting mechanism of the familiar toothed wheel and pen type, as shown, for example, in Fig. 1ª; which mechanism, when operated, will break and complete the circuit A according to some prearranged signal, distinctive of the particular box to which the transmitting mechanism operated belongs. Such signal may be considered to be a box number, each number to consist of two digits; one digit, preferably the initial digit, of the signals of the boxes of any one subscriber, i. e., the initial digit of all of the boxes of any one group, will be the same. In other words, the signals of all of the boxes of one group will begin with the digit "2"; the signals of all of the boxes of another group will begin with the digit "3"; and so on. It should be explained, further, that the term "digit" is employed herein in a special sense. In the ordinary sense the term "digit" includes any of the numerals from one to nine inclusive. The break wheels of the signal boxes comprise teeth, with intervening notches, arranged in two groups separated by spaces; and the number of teeth in any one of these groups may exceed 9; yet it is convenient to speak of the numeral represented by the teeth of any one such group as a digit, and no departure from principle is involved in so doing.

C designates a battery or other source of current supply, in circuit A, and D designates a main line relay, in said circuit A, which repeats the signals of boxes B in the local or central station circuits, as hereinafter described. The elements of the digit of the box signal are repeated by said relay D into the actuating magnet $a$ of a primary selector G as follows:

From supply conductor X through conductor 1 to the ratchet magnet $a$ of selector G, (hereinafter described), conductor 2, the first contact point and contact arm $b$ of a master selector F, (hereinafter described), and conductor 3 to the armature and rear contact stop of main line relay D, and thence through conductor 4, and common return conductor 7, to the other supply conductor Y. As the armature of main line relay D falls and rises during the operation of any one of the call boxes, this circuit 1—2—3—4—7 will be closed and broken successively, and it will be obvious that the impulses of the first digit of such signal box so operated, as such impulses are transmitted through magnet $a$ of selector G, will cause the contact arm $b$ of that selector to travel successively over the contact points of the selector until, at the end of the first digit of the box number, that contact arm $b$ will have come to rest on a particular contact point of the selector G, thereby forming a circuit through one of the wires 21—26 leading from the contact points of said selector G to one of the punch-operating magnets L—Q (the function of which punch magnets will be explained hereinafter).

E designates a slow acting "governor" relay, the magnet of which is connected by conductor 8 to supply conductor X and is connected by conductor 9 to the armature of line relay D. It will be obvious that each time the armature of relay D is retracted, circuit is completed through the magnet of relay E, and through conductor 7. However, this relay E is so slow in action that while its armature $e$ is moved away from the corresponding rear contact stop during the first closure of the contact of relay D in the transmission of a digit, it does not again contact with its rear stop during the spaces between closures by relay D during the transmission of that digit. The longer spaces, between the digits of the box signals, do, however, cause the armature of relay E to close contact with its rear contact stop, thereby closing a circuit from conductor X through conductor 10, the ratchet magnet $a$ of master selector F and conductor 11, the rear contact stop of relay E, armature $e$ and thence through conductor 7 to supply conductor Y. Closing this circuit 10—11 causes the contact arm $b$ of selector F to move to the second contact point of selector F, thereby cutting out of circuit the ratchet magnet $a$ of selector G and cutting into circuit 1—12—3—4—7, the ratchet magnet $a$ of a third selector, H. As explained hereinafter, this third selector, H, does not have contact points as do the previous selectors F and G, but instead comprises ratchet mechanism whereby, by the impulses of the second digit of the box signal repeated by relay D through magnet $a$ of this third selector H, the punches of the recording mechanism are spaced along to a position determined by the numerical value of the second digit of the box number.

The armature of relay E is attracted during the transmission of the impulses of the second digit of the box number; but during the space following the second digit, the armature of relay E is again released, thereby operating magnet $a$ of master selector F and moving the contact arm $b$ of that selector to the third contact point of the selector. The instant ratchet magnet $a$ of master selector F has been so energized, and has moved arm $b$ of master selector F into contact with the third contact point of that selector, a circuit is completed from supply conductor X through conductor 8, magnet E, conductors 9 and 3, contact arm $b$ of selector F, the third contact of that selector, dividing point $x$, the release magnet $m$ of selector H, the contact arm $b$ of selector G, the contact point of that selector on which such arm $b$ is then resting, the selected punch magnet of series L—Q (thereby causing action of the corresponding punching mechanism, as hereinafter described) and the return conductor to which those magnets are connected, to supply conductor Y. The armature $e$ of relay E being thereby attracted, the circuit of magnet $a$ of the master selector F is broken; and as the release magnets $m$ of selectors F and G have been energized simultaneously by closure of a circuit from supply conductor X, conductor 8, magnet E, conductors 9 and 3, contact arm $b$ of selector F, the third contact of that selector, point $x$, conductor 18, and conductor 18' to the other supply conductor Y, the arms $b$ of selectors F and G, and the punch-carrying carriage (hereinafter mentioned) of selector H will all return. The release of arm $b$ of selector G occurs upon the breaking of the circuit of its magnet $m$ by the return to normal of arm $b$ of selector F, following energization of magnets $m$ of selectors F and G. The arms $b$ of selectors F and G when permitted to return, move to a point somewhat beyond or in rear of the first contact points of those selectors. The magnet $a$ of selector F being in a circuit which is normally closed, and that magnet $a$ being energized immediately upon the return of the arm $b$ to normal, immediately moves such arm $b$ to the first contact point of selector F and holds it there until, the circuit of magnet $a$ being broken and subsequently completed, the ratchet pawl, hereinafter referred to, operated by such magnet $a$, retreats, engages another tooth of the ratchet operating-mechanism of that arm $b$, and moves such arm $b$ to the second point of the selector.

Magnet $a$ of selector G is in a normally open circuit, and therefore that arm $b$, when returned, remains in rear of the first of its series of contacts connected to magnets L—Q until, through the receipt of the first digit of the signal of a box, that arm $b$ is advanced to the first of such series of contacts, and possibly to some other contact point of the selector.

Figures 4, 5:
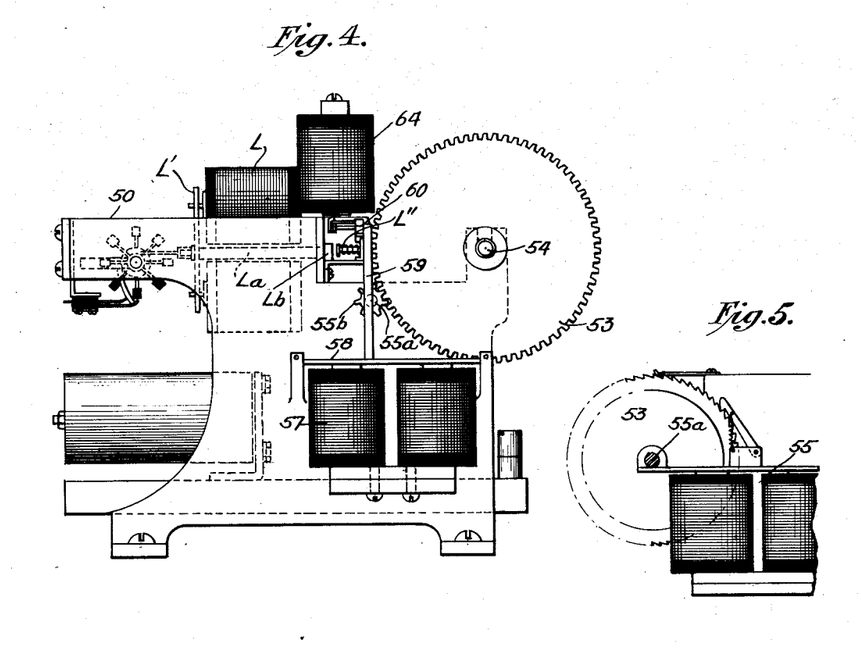
Fig. 4 shows a side elevation of the recorder looking from the right of Fig. 2.
Fig. 5 is a detail fragmentary elevation of the ratchet drive mechanism for the drum.
Figure 6:
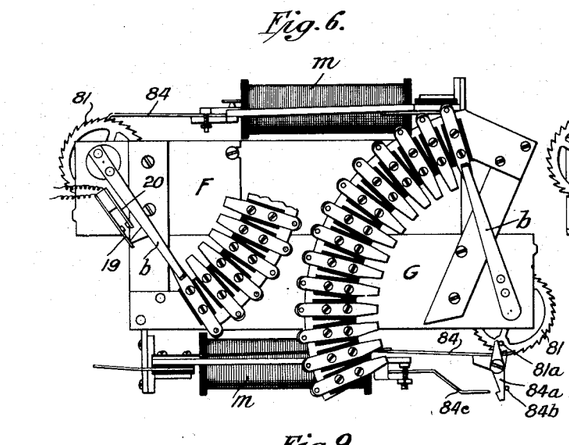
Fig. 6 shows a side elevation of the master selector and the primary selector, combined to form one mechanism.
Figure 7:
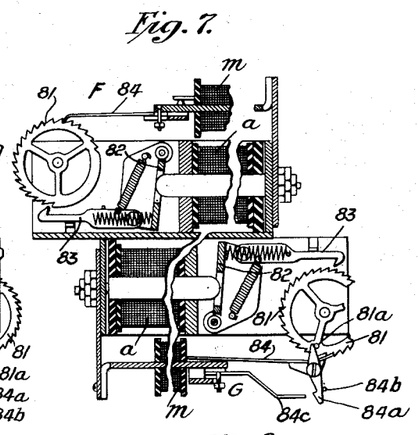
Fig. 7 is a central longitudinal section of the mechanism shown in Fig. 6, with the central portion of the mechanism broken away.
Figure 8:
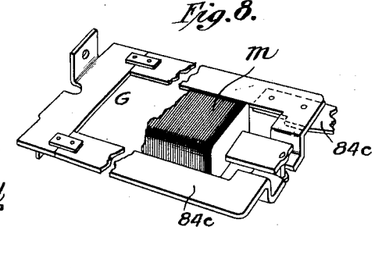
Fig. 8 is a detail perspective fragmentary elevation of the release magnet pole-piece and armature of the primary selector.
Figure 9:
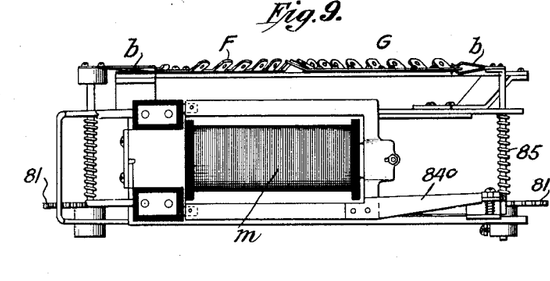
Fig. 9 is a top view of the selector mechanism shown in Fig. 6.

Referring now to Figs. 2-9 inclusive, illustrating the multi-record recorder itself, together with the several selectors which, though functionally instruments separate from the recorder, in the construction shown are structurally combined with the recorder proper:

50 designates a suitable frame upon which is mounted revolubly a drum 51 adapted to carry a suitable record sheet. 53 designates a gear wheel, mounted upon the shaft 54 of the drum 51, and 55 (Fig. 5) designates a magnet-operated ratchet mechanism by which gear wheel 53, and so drum 51, is rotated through counter shaft 55$^a$ and pinion 55$^b$ (Fig. 4). The magnet of this ratchet mechanism is energized at suitable intervals by a time movement, R, (Fig. 1), and relay S.

Figure 3:
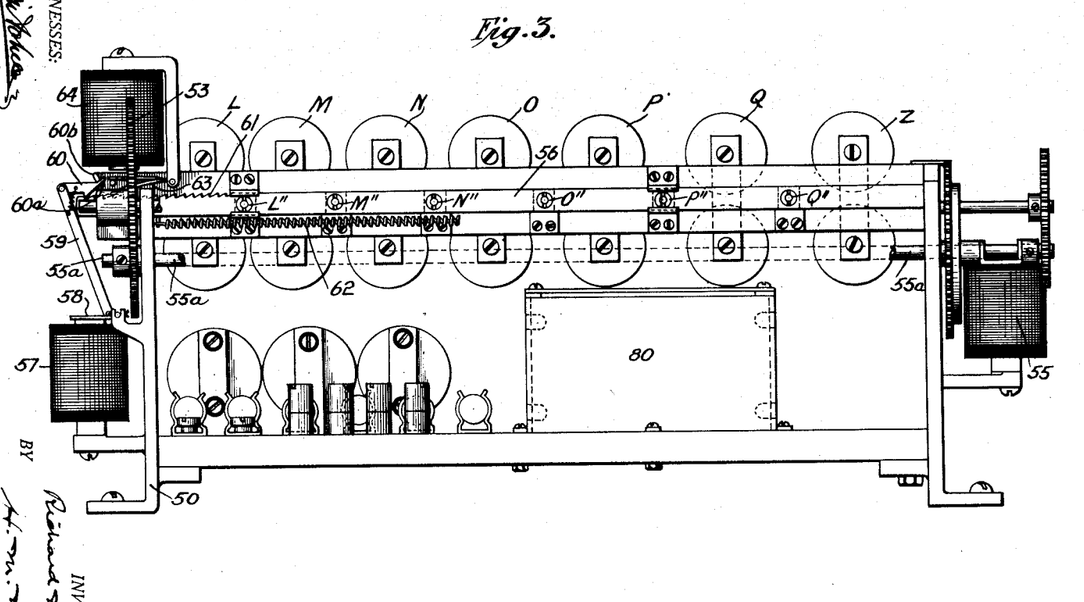
Fig. 3 shows a rear vertical elevation of the said recorder, with the record-carrying drum removed.

L, M, N, O, P, and Q designate punch-operating magnets, each corresponding to one of the groups of signal-boxes B of Fig. 1, and each, therefore, corresponding to a particular subscriber, as explained above. L', M', etc., designate the armatures of these magnets, and L'', M'', etc., the corresponding punches, operated by these magnets and armatures. The punches are all mounted upon a sliding bar 56, adapted to be moved step-by-step from left to right (as viewed from the front of the machine) by ratchet mechanism comprising a magnet 57 (Figs. 3 and 4), (which is the same as magnet $a$ of selector H of Fig. 1,) a swinging armature 58 therefor, having a projecting arm 59, and a spring-actuated pawl 60 adapted to engage teeth 61 formed on said bar 56. A pin 60$^a$ raises pawl 60 clear of the teeth 61, each time the armature of magnet 57 is retracted; and a pin 60$^b$ holds pawl 60 in engagement with a tooth 61 each time the armature of magnet 57 is attracted, and also prevents overthrow. A spring 62 tends to pull said bar to the right, (as seen in Fig. 3), and will restore the bar from any position to which it may have been adjusted by the ratchet mechanism, when permitted to do so. 63 designates a holding pawl for the bar 56, and 64 a magnet (which is the same as magnet $m$ of selector H of Fig. 1) which, when energized, will lift said pawl 63 thereby permitting spring 62 to restore punch-carrying bar 56. The armatures L', M', etc., having spring-actuated rods La, Ma, etc., carrying hammers Lb, Mb, etc., which are broad, and each will engage and operate its corresponding punch in any position to which that punch may have been adjusted by the action of the ratchet magnet 57 and pawl 60 on bar 56. The drum 51 has grooves 65 opposite the various punching-positions, so that the punch points, after passing through the record sheet, do not touch the surface of the drum and so are not blunted. Various parts of the recorder which are not essential for the understanding of the present invention, I have not described above.

*Selectors.*—The selectors F and G of the recorder are similar in construction, and are grouped in a case 80. Each of these selectors comprises a row of contact points, a contact-arm $b$ adapted to travel over these points successively and to make contact therewith, a ratchet wheel 81 connected to such arm $b$ to move the same, a ratchet magnet $a$, and armature 82 therefor, a spring-returned ratchet-pawl 83 operated by said armature 82, and engaging the teeth of ratchet wheel 81 to rotate said wheel, a holding pawl 84, and a release magnet $m$ which, in the case of selector F, when energized, pulls pawl 84 clear of the ratchet wheel 81, so permitting return movement of that ratchet wheel and contact arm $b$ under the influence of a spring 85. The manner of release arm $b$ of selector G will be explained hereinafter. When ratchet magnet $a$ of selector G is energized, the first portion of the resulting movement of the ratchet pawl 83 of that selector moves that pawl into engagement with a tooth of the corresponding ratchet wheel 81; further movement of that pawl advancing the ratchet-wheel through the space of one tooth, whereupon the ratchet wheel is held, temporarily, against return, by holding pawl 84. Successive energizations of the ratchet magnet $a$ of either selector advance the ratchet wheel 81 a number of spaces corresponding to the numerical value of the digit of the box signal by which that ratchet magnet is being operated.

The pawl 84 of selector G (the right hand selector shown in Figs. 6 and 7) carries a pawl 84$^a$ which, when the ratchet wheel 81 is in normal position, is held in the position shown by a pin 81$^a$ carried by ratchet wheel 81. When wheel 81 of selector G is advanced by ratchet pawl 82, a spring 84$^b$ forces pawl 84$^a$ into position for engagement with an extension of armature 84$^c$. When magnet $m$ of selector G is energized, the armature 84$^c$ is pulled up so that the extension of said armature engages with the hook of pawl 84$^a$. Upon deënergization of such magnet $m$ and consequent retraction of armature 84$^c$, the extension of such armature, being still in engagement with pawl 84$^a$, will raise that pawl, and with it, the holding pawl 84, so permitting return of ratchet wheel 81; and at the end of such return pin 81$^a$ disengages 84$^a$ from 84$^c$.

*Fire signals.*—Fire signals are usually distinguished from watchmen's signals by a dash, or by a Morse character containing a dash, preceding or following the box number; also, by giving the box number of a signal a greater number of times than for the watchman's signal. Signal boxes which distinguish in this manner between fire signals and watchmen's signals are well known and in common use. Such boxes commonly comprise means whereby the distinguishing signal (the dash or the Morse letter containing the dash) is omitted when sending watchmen's signals. The break wheel 90 shown in Fig. 1$^a$, which wheel is characteristic of break wheels forming a part of the transmitting mechanism of combined watchman and fire alarm boxes, has teeth for transmitting not only the box number (42, in the particular instance shown) but also the Morse letter F (dot, dash, dot). It is to be understood that, for watchmen's signals, the boxes B are provided with one of the well-known means for eliminating this letter F from the watchman's signal; but that when a fire signal is sent from any of these boxes the said Morse letter F is included as a part of the signal. This special fire signal is made evident at the central station as follows:

U and V, Fig. 1, are slow-acting relays, preferably similar to the relay E already described. These two relays are connected in what may be termed "cascade series"; that is to say, the contacts of relay U control the magnet circuit of relay V. The circuit for the magnet of relay U is from supply conductor X through conductor 8 to magnet of relay U, thence through conductor 13 to the armature of relay D, thence through conductors 4 and 7 to return at Y. This circuit is closed each time the pen 91 (Fig. 1$^a$) of the box rides upon one of the teeth of the signal wheel 90, and when in consequence, contact is broken between 91 and 92, and the armature of relay D drops. The circuit for relay V is from X and 8 through the contacts of relay U and thence, when these contacts are closed, through the magnet of relay V and to the armature of relay D and thence through the conductors 4 and 7 to return at Y. The retardation obtained by employing two such relays in cascade series, and by the proper adjustment of the relays, is such that the contacts of relay V are not closed while pen 91 is passing over the short teeth of the box number of break wheel 90, but are closed during the passage of pen 91 over the dash of the Morse letter F. The contacts of relay V, so closed, complete a circuit through the magnet of a "drop relay" W, as follows: from supply conductor X, conductor 14, conductor 3, conductor 15, magnet of relay W, contacts of relay V, conductor 16, magnet $m$ of selector F, magnet $m$ of selector G, and back to return at Y. This relay W has a drop armature, which, when attracted toward the magnet of the relay, brings together contacts 5 and 6, and thereby places a register 17 in circuit between the armature of relay D and supply conductor X. The register will then record subsequently received box number signals.

The drop armature of relay W is restored by hand (or otherwise) to open contacts 5 and 6 and throw the register 17 out of action. The mere deënergization of the magnet of the relay W does not restore the armature.

The sending of the Morse letter F (dot, dash, dot) does not affect the selectors F and H, because there being in this letter F no space equivalent to a space between digits, governor relay E is not operated. Selector G may be operated, but will be restored automatically. The relay E is operated by the impulses of the letter F, breaking the circuit of magnet $a$ of selector F; and since relays U and V close the circuits of release magnets $m$ of selectors F and G during the dash of the letter F, by a circuit from conductor X through conductors 14 and 3, magnet of relay W, contacts of relay V, conductor 16, magnets $m$ of selectors F and G, and thence to Y, arm $b$ of selector F drops back of the first contact point of selector F, and arm $b$ of selector G also drops back; but when, during the long space following the letter F, the armature of relay E drops, the circuit of magnet $a$ of selector F is completed again, and arm $b$ of that selector is brought back to the first contact point of that selector.

So far as yet described, the circuits and apparatus are substantially the same as those of my prior application Serial No. 171,940, above mentioned. The additions to the circuits and apparatus of that prior application, which additions form the subject matter of the present application, will now be described.

Upon the drum 51 of the recorder has been provided a separate section 93 for the purpose of recording clashes or other imperfect signals. Referring to Fig. 1, it will be noted that there are two relays, $T^2$ and $T^3$, connected in cascade series in the conductor 10 on opposite sides of the resistance 94. By cascade series is meant that the magnet circuit of one relay, $T^2$ for example, passes through the armature contacts of the other relay, $T^3$, so that the circuit of relay $T^3$ must be closed before the circuit of relay $T^2$ can be closed (a series of relays connected in cascade series constitutes, in effect, a single relay of very slow acting character, and in the following claims such a series of relays connected in cascade series is to be considered as included within the term "relay"). Another resistance, $94^a$, usually a tungsten lamp of about 25 watts, is also interposed in the circuit 10, and serves both as a resistance and as an indication of the condition of the circuit in which it is interposed.

Clashes or false signals usually occur through one watchman sending in a signal out of time, and while another watchman is already sending in a signal, or through a fire signal being sent from one of the boxes while a watchman's signal, or a fire signal, is being sent from another of the boxes. Such clashes or false signals may be of various characters. A false signal may consist of a single impulse only, or it may consist of a plurality of impulses greater than the number of impulses in the first digit of a regular signal, and without any long space such as separates the digits of a regular signal; or a false signal may be divided into digits, but the first digit may comprise a greater number of impulses than can be comprised in the first digit of a regular signal; or, the false signal, or clash signal, may contain a dash similar to that of the Morse character "F", with or without a long space, such as the spaces between digits. It is desirable, when possible, to record such false signals, or clashes, either in the clash column of the record sheet (by means of the magnet Z) or on the recorder 17, and not in any of the columns to which the regular signal magnets, L—Q inclusive, correspond. Likewise, it is important that no clash signal, or other false signal, shall leave the arm $b$ of the master selector F on the second or intermediate contact point of that selector; for, if this arm were left at this second or intermediate contact point, the selecting mechanism would be "locked up."

Obviously, in the case of a clash or false signal consisting of a single dot, or of a plurality of dots greater than those contained in a regular digit signal, there will follow a space until the restoring devices, such as herein described, function. The slow action relays $T^2$ and $T^3$ (together constituting, as already stated, a single slow acting relay) are provided to distinguish between the long spaces between digits of a regular signal, and the longer spaces following a false signal; that is to say, these relays are provided to permit of time intervals, in excess of the length of the spaces between digits of regular signals, after which the said restoring means shall come into action, together with the clash recording magnet Z. The circuit connections by which the circuit of the magnet of relay Z is closed through the contact points of relays $T^2$ and $T^3$ are as follows: from conductor X, through conductor 14, conductor 3, conductor 95, magnet of relay Z, conductor 96, contact points of relay $T^2$, conductor 97, contacts 19 and 20 of master selector F (contact being closed between 19 and 20 when arm $b$ of master selector F is on its second contact point,) point $x$, release magnet $m$ of selector F, release magnet $m$ of selector G, and through conductor 18' to return conductor Y; also from point $x$ through magnet $m$ of selector H, the contact arm $b$ of selector G and the particular contact point of that selector, on which arm $b$ is then resting, to return conductor Y. By the closing of the circuit mentioned all of the selectors of the recorder will be returned to zero.

The above described arrangement will cause the registration of a clash by the clash magnet Z, and also the return of the selectors to normal, in case the signal containing the clash is of such a nature as to leave the contact arm $b$ of selector F upon the second contact point of that selector.

A false signal, consisting of a single impulse only, will have the effect of moving the contact arm $b$ of selector F to its second contact point; and will also have the effect of moving the arm $b$ of selector G to the contact point connected to punch magnet L; but since selector H (comprising the punch carriage) has not been operated by such a signal, no registration by punch L' will occur, the clash being represented only by the record made by the clash magnet. Similarly, other false signals consisting of a plurality of impulses not separated by a long space, such as a space between digits, will not cause the operation of the selector H, and so will be represented on the record sheet only by the punch mark made by the clash magnet Z. In case the false signal contains a number of impulses greater than the impulses in the first digit of a regular signal (and with no long space between impulses) or, in case the false signal consists of a plurality of digits, the first of which contains a number of impulses greater than the impulses in the first digit of a regular signal, then the arm $b$ of selector G will come to rest on a final contact point of that selector which is connected through the circuit closed by relay $T^3$ and through the contacts of magnet Z to this final contact point of the selector and thence through the arm $b$ of that selector to the restoring circuits; and thereby the various selectors will be restored to zero.

There are certain other kinds of clashes, namely, those which contain a dash similar to that of the Morse character "F" and which do not contain spaces, other than those between the regular impulses of a digit, which will not be recorded in the clash column, by the means just above described. Such signals, however, viz., clash signals containing a dash similar to that of the Morse character "F" and not containing long spaces, will operate the drop relay W through the action of the relays U and V, and so will cause the operation of the register 17 and the return of the recorders to normal, substantially in the same manner as described in my said prior application, Serial No. 171,940, i. e., as follows:

Should, for any reason, a signal containing a dash similar to that of the Morse character "F" and not containing spaces other than those between digits be received, then, upon the reception of the dash, relays U and V will be operated, relay V closing a circuit as follows: from conductor X, through conductor 14, armature of relay D, conductor 3, magnet of drop relay W, contacts of relay V to point $x$, and thence through the clearing circuits containing the release magnets, as described heretofore. The magnet of drop relay W being energized, the register 17 is placed in circuit, and the remainder of such a clash signal will be recorded on the register.

In my prior application, Serial No. 171,940, above referred to, I have disclosed recording apparatus wherein a master selector F, similar to the master selector F of the present application, is provided with contact points similar to the contact points 19 and 20 of the present invention; and have also provided a slow acting relay in series with a ratchet magnet of the master selector. But the connections of the contact points 19 and 20 and of the slow acting relays $T^2$ and $T^3$ of the present case are quite different from the connections of the corresponding parts in my said prior application; and attention is drawn to this fact to avoid possible confusion.

Without restricting myself in any way to relative resistances in the several circuits, I may say that the resistance indicated in conductor 14 may be 250 ohms; that the resistance in the conductor leading from magnet of relay V to armature of relay D may be 800 ohms; that the resistance in the conductor leading from magnet of relay E to armature of relay D may be 1000 ohms; that the magnet of relay D may have a resistance of 150 ohms; that the magnet of relay E may have a resistance of 200 ohms; that the resistance in conductor 1 may be of 500 omhs; that the various ratchet magnets $a$ and release magnets $m$ may each be of about 150 ohms. Though the release magnet $m$ of selector H is preferably of 200 ohms; that resistance 94 in conductor 10 may be of about 90 ohms; that the magnets of relays $T^2$ and $T^3$ may be of 250 ohms, and the magnet of relay Z may be of 150 ohms. As above indicated, these values are not definite; but they are values which have been used in a particular installation.

In a companion application, Docket No. 4760, I have illustrated and described a recording system and apparatus wherein records are made on a record sheet by means of electric sparks instead of by punch marks, as in the present application; the apparatus of said companion application being otherwise, in large measure, an adaptation of the mechanism and circuits of the present case, to apparatus wherein electric sparks, instead of punches, are used.

What I claim is:

1. In a selective system, the combination with a line relay and signaling means adapted for actuating said relay by signals comprising a plurality of groups of impulses, of a plurality of selectors arranged to be connected successively to said line relay for actuation thereby, a master selector arranged to switch said first mentioned selectors into connection with said line relay successively, restoring means for the selectors, means for recording imperfect signals, and time relay means arranged to cause operation of such recording means and restoring means at the end of such an imperfect signal.

2. In a selective system, the combination with a line relay and signaling means adapted for actuating said relay by signals comprising a plurality of groups of impulses, of a plurality of selectors arranged to be connected successively to said line relay for actuation thereby, a master selector arranged to switch said first mentioned selectors into connection with said line relay successively, recording means normally actuated by said selectors, restoring means for the selectors, means for recording imperfect signals, and time relay means arranged to cause operation of such imperfect-signal recording means and restoring means at the end of such an imperfect signal.

3. In a sleective system, the combination with a line relay and signaling means adapted for actuating said relay by signals comprising a plurality of groups of impulses, of a plurality of selectors arranged to be connected successively to said line relay for actuation thereby, a master selector arranged to switch said first mentioned selectors into connection with said line relay successively, restoring means comprising slow acting relay means arranged to cause restoration of said selectors and master selector to normal in the event of reception of an imperfect signal, and a clash recording device controlled by said slow acting relay means and having contacts which are operated when said clash recording device is operated, one of the selectors other than the master selector comprising a final contact connected in series with said contacts of the clash recording device to the restoring means of said selectors, whereby the selectors are restored to normal in the event of reception of a signal containing a greater number of impulses in one digit than a regular signal should contain.

4. In a selective system, the combination with a line relay and signaling means adapted for actuating said relay by signals comprising a plurality of groups of impulses, of a plurality of selectors arranged to be connected successively to said line relay for actuation thereby, a master selector arranged to switch said first mentioned selectors into connection with said line relay successively, a governor, controlling the actuating circuit of said master selector and operated by spaces between impulse groups, but not by shorter spaces between impulses, restoring means set in operation by said master selector and the governor during the space following a complete signal, and other restoring means arranged to restore said selectors and master selector to normal in the event of reception of an imperfect signal, and comprising a clash recording device arranged to record imperfect signals, other than those containing dashes, and time relay means arranged to cause operation of such clash recording means at the end of such an imperfect signal.

5. In a selective system, the combination with a plurality of secondary selectors, and signaling means adapted for actuating said selectors and adapted to be connected to said secondary selectors successively, of a master selector arranged to switch said secondary selectors into connection with said signaling means successively, restoring means arranged to restore said secondary selectors and master selector to normal, after normal signals, or in the event that the master selector is left, for a prolonged period, in an intermediate condition, and a clash recording device arranged to record imperfect signals, other than those containing dashes.

6. In a selective system, the combination with a plurality of secondary selectors, and signaling means adapted for actuating said selectors and adapted to be connected to said secondary selectors successively, of a master selector arranged to switch said secondary selectors into connection with said signaling means successively, restoring means comprising a slow acting relay and arranged to cause restoration of said secondary selectors and master selector to normal after normal signals, or in the event that the master selector is left, for a prolonged period, in an intermediate condition, and a clash recording device arranged to record imperfect signals, other than those containing dashes.

7. In a selective system, the combination with a plurality of secondary selectors, and signaling means adapted for actuating said selectors and adapted to be connected to said secondary selectors successively, of a master selector arranged to switch said secondary selectors into connection with said signaling means successively, restoring means comprising a slow acting relay arranged to cause restoration of said secondary selectors and master selector to normal after normal signals, or in the event that the master selector is left, for a prolonged period, in an intermediate condition, and a clash recording device arranged to record imperfect signals other than those containing dashes, and controlled by said slow acting relay.

8. In a selective system, the combination with a plurality of secondary selectors and signaling means adapted to actuate said secondary selectors by signals comprising a plurality of groups of impulses, of a master selector arranged to switch said secondary selectors successively into operative connection with said signaling means, a governor, controlling the actuating circuit of said master selector, and operated by spaces between impulse groups, but not by shorter spaces between impulses, restoring means set in operation by said master selector and the governor during the space following a complete signal, other restoring means arranged to restore said selectors and master selector to normal, in the event that the master selector is left, for a prolonged period, in an intermediate condition, and a clash recording device arranged to record imperfect signals, and controlled by said last mentioned restoring means.

9. In a selective system, the combination with a plurality of secondary selectors and signaling means adapted to actuate said secondary selectors by signals comprising a plurality of groups of impulses, of a master selector arranged to switch said secondary selectors successively into operative connection with said signaling means, a governor, controlling the actuating circuit of said master selector, and operated by spaces between impulse groups, but not by shorter spaces between impulses, restoring means set in operation by said master selector and the governor during the space following a complete signal, other restoring means arranged to restore said selectors and master selector to normal, in the event that the master selector is left, for a prolonged period, in an intermediate condition and comprising a slow acting relay, and a clash recording device arranged to record improper signals, and controlled by said slow acting relay.

10. In a selective system, the combination with a plurality of secondary selectors, and signaling means adapted to actuate said secondary selectors by signals comprising a plurality of groups of impulses, and by signals comprising impulses of differing lengths, of a master selector arranged to switch said secondary selectors successively into operative connection with such signaling means, a governor, controlling the actuating circuit of said master selector, and operated by spaces between impulse groups, but not by shorter spaces between impulses, restoring means set in operation by said master selector and the governor during the space following a complete signal, other restoring means set in operation by one of the longer impulses, still other restoring means arranged to restore said selectors and master selector to normal, in the event that the master selector is left, for a prolonged period, in an intermediate condition, and a clash recording device arranged to record imperfect signals, and controlled by said last mentioned restoring means.

11. In a selective system, the combination with a plurality of secondary selectors, and signaling means adapted to actuate said secondary selectors by signals comprising a plurality of groups of impulses, and by signals comprising impulses of differing lengths, of a master selector arranged to switch said secondary selectors successively into operative connection with such signaling means, a governor, controlling the actuating circuit of said master selector, and operated by spaces between impulse groups, but not by shorter spaces between impulses, restoring means set in operation by said master selector and the governor during the space following a complete signal, other restoring means set in operation by one of the longer impulses, still other restoring means arranged to restore said selectors and master selector to normal in the event that the master selector is left, for a prolonged period, in an intermediate condition, and comprising a slow acting relay, and a clash recording device arranged to record imperfect signals, and controlled by said slow acting relay.

12. In a selective system, the combination with a line relay and signaling means adapted for actuating said relay by signals comprising a plurality of groups of impulses, of a plurality of selectors arranged to be connected successively to said line relay for actuation thereby, a master selector arranged to switch said first mentioned selectors into connection with said line relay successively, restoring means for the selectors, time relay means arranged to be actuated only by dashes occurring in said signals, and arranged to close a circuit from a source of supply to the said restoring means, when so operated, said master selector having contacts which are closed while intermediate main contacts of that selector are closed, and time relay means arranged to close a circuit from a source of supply direct to said restoring means at the end of a space longer than the spaces between groups of impulses.

13. In a recorder, the combination of a plurality of recording means each adapted to make a record on one or another of a plurality of points on a record sheet, according as said recording means may be operated, selecting means adapted to be controlled by line signals and to select a particular recording means and a particular point on the record sheet at which a record shall be made by the selected recording means, and means for recording imperfect signals arranged to record such signals as do not cause the selection of a particular one of the main series of recording means or do not cause the selection of a particular point at which one of such main recording means shall make a record on the record sheet.

14. In a recorder, the combination with a line relay and signaling means adapted for actuating said relay by signals comprising a plurality of groups of impulses, of a plurality of selectors arranged to be connected successively to said line relay for actuation thereby, a master selector arranged to switch said first mentioned selectors into connection with said line relay successively, a plurality of recording means controlled selectively by said selectors, said selectors arranged by their action to select a particular one of said recording means and a particular point on a recording sheet at which such recording means may make a record, other recording means for recording imperfect signals, and means controlling same arranged to cause such imperfect-signal recording means to record imperfect signals which do not cause actuation of the selectors up to the point of selecting a particular recording means or to the selection of a particular point on the record sheet at which a selected recorder may make a record.

15. In a recorder, the combination with a record-sheet carrier and means for moving the same, of a secondary selector and a plurality of record-making devices controlled thereby and located opposite corresponding portions of said record-sheet carrier, said secondary selector arranged when operated to cause the selection of a particular point at which a record shall be made by one of said record-making devices, said recording devices and secondary selector relatively arranged so that when said selector is in normal condition none of said recording devices will be operated, a primary selector arranged to determine which of said recording devices may be operated by the secondary selector, a master selector arranged to determine the operation both of the primary and also of the secondary selector under control of signals, imperfect-signal recording means arranged opposite a corresponding portion of such record-sheet carrier, and means controlling same arranged to cause the same to record imperfect signals which do not cause actuation of the secondary selector.

16. In a recorder, the combination with a record-sheet carrier and means for moving the same, of a secondary selector and a plurality of record-making devices controlled thereby and located opposite corresponding portions of said record-sheet carrier, said secondary selector arranged when operated to cause the selection of a particular point at which a record shall be made by one of said record-making devices, said recording devices and secondary selector relatively arranged so that when said selector is in normal condition none of said recording devices will be operated, a primary selector arranged to determine which of said recording devices may be operated by the secondary selector, a master selector arranged to determine the operation both of the primary and also of the secondary selector under control of signals, imperfect-signal recording means arranged opposite a corresponding portion of such record-sheet carrier, and means controlling same arranged to cause the same to record imperfect signals which do not cause actuation of the secondary selector, and likewise arranged to cause restoration of the selectors to normal.

17. In a recorder, the combination with a record-sheet carrier, and means for moving the same, of a plurality of record making devices and a movable carriage upon which the same are mounted, and step by step means for advancing said carriage in a direction transverse to that of motion of the record-sheet carrier, a selector arranged to select a particular one of said record making devices, a master selector arranged to control the operation of said first mentioned selector and said step by step means in accordance with the signals, said record making devices arranged to make no record until after one step at least of said carriage, imperfect-signal recording means arranged opposite a corresponding portion of said record-sheet carrier, and means controlling same arranged to cause the same to record imperfect signals which do not cause at least one step of advance of the carriage.

18. In a recorder, the combination with a record-sheet carrier, and means for moving the same, of a plurality of record making devices and a movable carriage upon which the same are mounted, and step by step means for advancing said carriage in a direction transverse to that of motion of the record-sheet carrier, a selector arranged to select a particular one of said record making devices, a master selector arranged to control the operation of said first mentioned selector and said step by step means in accordance with the signals, said record making devices arranged to make no record until after one step at least of said carriage, imperfect-signal recording means arranged opposite a corresponding portion of said record-sheet carrier, and means controlling same arranged to cause the same to record imperfect signals which do not cause at least one step of advance of the carriage, and likewise arranged to cause restoration of the selectors to normal.

In testimony whereof I have signed this specification in the presence of two subscribing witnesses.

RICHARD M. HOPKINS.

Witnesses:
ARTHUR ECKERT STEARNS,
ABIGAIL FAY MCCLEAN.